(12) United States Patent
Aposolo et al.

(10) Patent No.: US 9,458,272 B2
(45) Date of Patent: Oct. 4, 2016

(54) LOW VISCOSITY FLUOROELASTOMERS

(75) Inventors: Marco Apostolo, Senago (IT); Giovanni Comino, Monza (IT); Marco Cristini, Urgnano (IT)

(73) Assignee: SOLVAY SPECIALTY POLYMERS ITALY S.P.A., Bollate (Milano) (IT)

( * ) Notice: Subject to any disclaimer, the term of this patent is extended or adjusted under 35 U.S.C. 154(b) by 0 days.

(21) Appl. No.: 13/993,782

(22) PCT Filed: Dec. 13, 2011

(86) PCT No.: PCT/EP2011/072520
§ 371 (c)(1),
(2), (4) Date: Jun. 13, 2013

(87) PCT Pub. No.: WO2012/084587
PCT Pub. Date: Jun. 28, 2012

(65) Prior Publication Data
US 2013/0261249 A1 Oct. 3, 2013

(30) Foreign Application Priority Data
Dec. 20, 2010 (EP) .................... 10195983

(51) Int. Cl.
| C09D 129/10 | (2006.01) |
| C08F 216/14 | (2006.01) |
| C08F 14/18 | (2006.01) |
| C08F 2/38 | (2006.01) |
| C08F 214/18 | (2006.01) |
| C08F 214/22 | (2006.01) |

(52) U.S. Cl.
CPC ........... *C08F 216/1408* (2013.01); *C08F 2/38* (2013.01); *C08F 14/18* (2013.01); *C09D 129/10* (2013.01); *C08F 214/18* (2013.01); *C08F 214/184* (2013.01); *C08F 214/222* (2013.01)

(58) Field of Classification Search
USPC .......................... 524/546; 526/247
See application file for complete search history.

(56) References Cited

U.S. PATENT DOCUMENTS

| 3,752,787 A | 8/1973 | De Brunner |
| 3,876,654 A | 4/1975 | Pattison |
| 4,035,565 A | 7/1977 | Apotheker et al. |
| 4,233,427 A | 11/1980 | Bargain et al. |
| 4,243,770 A | 1/1981 | Tatemoto et al. |
| 4,259,463 A | 3/1981 | Moggi et al. |
| 4,281,092 A | 7/1981 | Breazeale |
| 4,394,489 A | 7/1983 | Aufdermarsh |
| 4,564,662 A | 1/1986 | Albin |
| 4,694,045 A * | 9/1987 | Moore ............... C08F 214/262 525/276 |
| 4,745,165 A | 5/1988 | Arcella et al. |
| 4,943,622 A | 7/1990 | Naraki et al. |
| 5,173,553 A | 12/1992 | Albano et al. |
| 5,447,993 A | 9/1995 | Logothetis |
| 5,767,204 A | 6/1998 | Iwa et al. |
| 5,789,489 A | 8/1998 | Coughlin et al. |
| 5,789,509 A | 8/1998 | Schmiegel |
| 5,852,125 A | 12/1998 | Krüger et al. |
| 5,969,064 A | 10/1999 | Krüger et al. |
| 7,705,083 B2 * | 4/2010 | Stanga et al. ............. 524/430 |
| 2003/0166807 A1 | 9/2003 | Harrison et al. |
| 2005/0124773 A1* | 6/2005 | Tang ................ C08F 214/22 526/250 |
| 2005/0245691 A1* | 11/2005 | Stanga et al. ............ 525/331.1 |
| 2010/0286329 A1* | 11/2010 | Fukushi et al. ............. 524/544 |

FOREIGN PATENT DOCUMENTS

| CA | 2268072 A1 | 4/1998 |
| EP | 0120462 A1 | 10/1984 |
| EP | 0136596 A2 | 4/1985 |
| EP | 0182299 A2 | 5/1986 |
| EP | 0199138 A2 | 10/1986 |
| EP | 0335705 A1 | 10/1989 |
| EP | 0410351 A1 | 1/1991 |
| EP | 0661304 A1 | 7/1995 |
| EP | 0684277 A1 | 11/1995 |
| EP | 0860436 A1 | 8/1998 |
| EP | 1148072 A2 * | 10/2001 |
| WO | WO 9502634 A1 | 1/1995 |
| WO | WO 9705122 A1 | 2/1997 |
| WO | WO 9815583 A1 | 4/1998 |
| WO | WO 2009027213 A1 | 3/2009 |

* cited by examiner

*Primary Examiner* — Peter D Mulcahy

(57) ABSTRACT

The invention pertains to a low viscosity curable (per) fluoroelastomer [fluoroelastomer (A)] having a number-averaged molecular weight of 3 000 to 45 000, said (per) fluoroelastomer comprising at least 1% moles, with respect to the total moles of recurring units, of recurring units derived from at least one (per)fluoromethoxyalkylvinylether of formula (I):

$$CFX'=CX''OCF_2OR_f \qquad \text{formula (I)}$$

wherein X' and X", equal to or different from each other, are independently H or F; and $R_f$ is selected from the group consisting of $C_1\text{-}C_6$ (per)fluoroalkyls, linear or branched; $C_5\text{-}C_6$ cyclic (per)fluoroalkyls; and $C_2\text{-}C_6$ (per)fluorooxy-alkyls, linear or branched, comprising from 1 to 3 catenary ethereal oxygen atoms [monomer (M)].

14 Claims, No Drawings

US 9,458,272 B2

LOW VISCOSITY FLUOROELASTOMERS

CROSS-REFERENCE TO RELATED APPLICATIONS

This application is a U.S. national stage entry under 35 U.S.C. §371 of International Application No. PCT/EP2011/072520 filed Dec. 13, 2011, which claims priority to European application No. 10195983.1 filed on Dec. 20, 2010, the whole content of this application being incorporated herein by reference for all purposes.

TECHNICAL FIELD

The present invention relates to novel fluoroelastomers, to a process for their production and their use, as well as a process for producing fluororubber mouldings and/or coatings.

BACKGROUND ART

In the rubber industry there is a general desire for improved processability of the rubbers that are used, especially as regards the flow characteristics. The lower the viscosity of the rubber, the simpler the processing technology, the greater the productivity, and thus the less wastage there is. These aspects are very important, especially with fluororubbers, since these are expensive rubbers that cannot be processed completely on injection moulding machines used in the rubber industry.

Thanks to its high throughput and simplicity, the liquid injection moulding technique has found wide use in the elastomer domain, in particular for the processing of silicon rubbers, typically provided as two-components liquid mixtures, comprising a crosslinkable resin and a catalyst.

So-called 'liquid' or low viscosity fluoroelastomers have been proposed in the art as materials intended for processing notably via liquid injection moulding machines, i.e. processing tools wherein much lower temperatures and pressures are used with respect to traditional injection moulding devices which are intended to process molten materials.

Traditional injection moulding machines generally consist of a material hopper, an injection ram or screw-type plunger, and a heating unit or press, which holds the mould in which the components are shaped; in the liquid injection moulding devices, the ram or plunger is merely replaced by a metering injectors. For sure, pressure applied both for forcing flow of the material in the press and for achieving precise shaping in the press itself are extremely different in these alternative configurations, a standard injection moulding device working typically with molten polymers at pressures of 100÷200 bar, while in a so called 'liquid' injection moulding machines, pressures of 15÷20 bar being largely sufficient to promote flow of material into the mould.

Further in addition, liquid status or low viscosity are required for processing according to screen printing or form-in-place techniques. According to the former technique, a woven mesh is generally used for supporting a stencil. Said stencil thus provides open areas enabling transferring a liquid precursor of the elastomer ink (either neat or as a solution) as a sharp-edged image onto a substrate. To this aim, a roller or squeegee is generally moved across the screen stencil, forcing or pumping the liquid ink past the threads of the woven mesh in the open areas. Subsequent curing and optionally evaporating/drying the solvent carrier enables fixing the elastomer into target shape. Within this processing technique, the use of liquid or low viscosity elastomers could enable avoiding the use of liquid carriers, with substantial advantages in equipment simplicity, environmental friendliness and processing speed.

As per the latter technique is concerned, the rubber precursor is dispensed onto the parts in a viscous uncured form using dispense nozzles especially designed, e.g. to attain specific gasket sizes & shapes. Viscosity of the elastomer should be such to be efficiently ejected from nozzles, while still retaining the shape of ejected form onto the part until curing occurs. The dispensed parts can either be cured using an inline heating oven or placed in a stand alone oven for batch curing.

The challenge of the use of these techniques for processing fluororubbers is to simultaneously achieve a suitable low liquid viscosity of the fluoroelastomer, to advantageously ensure appropriate flow of the material in the mould, during the roll coating and/or in the dispenser nozzle, while still ensuring outstanding curing capabilities, so as to provide for finished article having required mechanical and sealing properties at reasonable throughput rate.

Liquid fluoroelastomers endowed with reduced viscosities have been disclosed in the art.

Thus, document U.S. Pat. No. 5,852,125 (BAYER AG) 22 Dec. 1995 discloses VDF-based fluoroelastomers which can be pumped in liquid state at low temperatures (60-120° C.) and which are readily crosslinkable, said fluoroelastomers having a molecular weight of 3 000 to 30 000, comprising iodine and/or bromine as cure-site and comprising fluorine containing monomers, among which mention is made of vinyl ethers of formula $CF_2=CF-O-X$, with X being a perfluoroalkyl $C_1$-$C_3$ or a group of formula $-(CF_2CFYO)_n-R_f$, with n=1-4, Y=F or $CF_3$ and $R_f$ being a $C_1$-$C_3$ perfluoroalkyl.

Similar materials are also disclosed in document WO 98/15583 (BAYER AG [DE]) 16 Apr. 1998, which pertains to liquid fluoroelastomers having iodine content of 0.5 to 2.5% wt; having $M_n$ between 10 000 and 25 000, with a polydispersity index ($M_w/M_n$) of strictly less than 1; said fluoroelastomers being VDF-based polymers further comprising fluorine containing monomers, among which mention is made of vinyl ethers of formula $CF_2=CF-O-X$, with X being a perfluoroalkyl $C_1$-$C_3$ or a group of formula $-(CF_2CFYO)_n-R_f$ with n=1-4, Y=F or $CF_3$ and $R_f$ being a $C_1$-$C_3$ perfluoroalkyl.

Also, TFE-containing liquid fluoroelastomers have been disclosed; thus, document US 2003166807 (BAYER AKTIENGESELLSCHAFT) 4 Sep. 2003 pertains to liquid fluororubbers comprising recurring units derived from TFE (in an amount exceeding 10% moles), said fluoroelastomers:
  containing up to 1% wt of iodine or bromine;
  having a number averaged molecular weight of more than 25 000;
  further comprising recurring units derived from comprising fluorine containing monomers, among which mention is made of perfluorinated vinyl ethers of formula $CF_2=CF-O-X$, with X being a perfluoroalkyl $C_1$-$C_3$ or a group of formula $-(CF_2CFYO)_n-R_f$, with n=1-4, Y=F or $CF_3$ and $R_f$ being a $C_1$-$C_3$ perfluoroalkyl.

Nevertheless, experiences with fluoroelastomers as above detailed have shown that even selecting fluoroelastomers having limited molecular weight (e.g. a weight averaged molecular weight of about 10÷30 k), the viscosity of the liquid still might not be optimized for processing these materials according to liquid injection moulding, screen printing of form-in-place techniques.

Incidentally, EP 1148072 A (AUSIMONT SPA) 24 Dec. 2001 discloses fluoro-vinylethers of formula CFX'=CXOCF$_2$OR and polymers obtained therefrom, either by polymerizing said monomers alone or by polymerizing the same in combination with other (per)fluoromonomers. No general teaching is provided in the specification as per the molecular weight of such polymers. Among exemplified working embodiments, Ex. 7 pertains to a CF$_2$=CFOCF$_2$O—CF$_2$CF$_3$) homopolymer, which is taught as possessing a molecular weight as determined by $^{19}$F-NMR of 50 000. Similarly, Ex. 8 discloses a copolymer obtained by co-polymerization of CF$_2$=CFOCF$_2$O—CF$_2$CF$_2$OCF$_3$ and CF$_2$=CFOCF$_2$O—CF(CF$_3$)OCF$_3$, which is taught as possessing a molecular weight as determined by 19F-NMR of 35 000.

There is thus still a current shortfall in the art for liquid fluoroelastomers that can at least be pumped at limited temperatures and that can be processed not only in conventional processing machinery but also in liquid injection moulding, screen printing and form-in-place devices maintaining outstanding cross-linking behaviour, and yielding resulting final parts exhibiting good mechanical as well as ageing properties, substantially similar to those of conventional solid fluororubbers.

The object of the present invention is therefore to provide fluoroelastomers that advantageously exhibit this property profile.

SUMMARY OF INVENTION

It is thus an object of the present invention a low viscosity curable (per)fluoroelastomer [fluoroelastomer (A)] having a number-averaged molecular weight of 3 000 to 45 000, said (per)fluoroelastomer comprising at least 1% moles, with respect to the total moles of recurring units, of recurring units derived from at least one (per)fluoromethoxyalkylvinylether of formula (I):

CFX'=CX"OCF$_2$OR$_f$                    formula (I)

wherein X' and X", equal to or different from each other, are independently H or F; and R$_f$ is selected from the group consisting of C$_1$-C$_6$ (per)fluoroalkyls, linear or branched; C$_5$-C$_6$ cyclic (per)fluoroalkyls; and C$_2$-C$_6$ (per)fluorooxyalkyls, linear or branched, comprising from 1 to 3 catenary ethereal oxygen atoms [monomer (M)].

The Applicant has surprisingly found that the incorporation of recurring units derived from monomer (M) of formula (I) as above detailed enables substantial reduction of the viscosity of the fluoroelastomer (A) at given molecular weight, so that easy processing, including in liquid injection moulding, screen printing and form-in-place devices is made possible. Further in addition, fluoroelastomers comprising recurring units as above detailed are endowed with outstanding crosslinking behaviour and provide final cured parts possessing suitable mechanical and sealing properties.

For the purposes of this invention, the term "(per)fluoroelastomer" [fluoroelastomer (A)] is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Fluoroelastomer (A) typically comprises recurring units derived from monomer (M) and from at least one (per)fluorinated monomer different from monomer (M).

Non limitative examples of said suitable (per)fluorinated monomers, which can be used in combination with monomer (M), are notably:

C$_2$-C$_8$ fluoro- and/or perfluoroolefins, such as tetrafluoroethylene (TFE), hexafluoropropene (HFP), pentafluoropropylene, and hexafluoroisobutylene;

C$_2$-C$_8$ hydrogenated monofluoroolefins, such as vinyl fluoride;

1,2-difluoroethylene, vinylidene fluoride (VDF) and trifluoroethylene (TrFE);

(per)fluoroalkylethylenes complying with formula CH$_2$=CH—R$_{f0}$, in which R$_{f0}$ is a C$_1$-C$_6$ (per)fluoroalkyl or a C$_1$-C$_6$ (per)fluorooxyalkyl having one or more ether groups;

chloro- and/or bromo- and/or iodo-C$_2$-C$_6$ fluoroolefins, like chlorotrifluoroethylene (CTFE);

fluoroalkylvinylethers complying with formula CF$_2$=CFOR$_{f1}$ in which R$_{f1}$ is a C$_1$-C$_6$ fluoro- or perfluoroalkyl, e.g. —CF$_3$, —C$_2$F$_5$, —C$_3$F$_7$;

hydrofluoroalkylvinylethers complying with formula CH$_2$=CFOR$_{f1}$ in which R$_{f1}$ is a C$_1$-C$_6$ fluoro- or perfluoroalkyl, e.g. —CF$_3$, —C$_2$F$_5$, —C$_3$F$_7$;

fluoro-oxyalkylvinylethers different from formula (I) and complying with formula CF$_2$=CFOX$_0$, in which X$_0$ is a C$_1$-C$_{12}$ oxyalkyl, or a C$_1$-C$_{12}$ (per)fluorooxyalkyl having one or more ether groups, like perfluoro-2-propoxy-propyl;

functional fluoro-alkylvinylethers complying with formula CF$_2$=CFOY$_0$, in which Y$_0$ is a C$_1$-C$_{12}$ alkyl or (per)fluoroalkyl, or a C$_1$-C$_{12}$ oxyalkyl or a C$_1$-C$_{12}$ (per)fluorooxyalkyl, said Y$_0$ group comprising a carboxylic or sulfonic acid group, in its acid, acid halide or salt form;

fluorodioxoles, of formula:

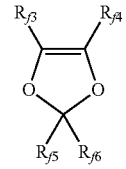

wherein each of R$_{f3}$, R$_{f4}$, R$_{f5}$, R$_{f6}$, equal or different each other, is independently a fluorine atom, a C$_1$-C$_6$ fluoro- or per(halo)fluoroalkyl, optionally comprising one or more oxygen atom, e.g. —CF$_3$, —C$_2$F$_5$, —C$_3$F$_7$, —OCF$_3$, —OCF$_2$CF$_2$OCF$_3$.

Examples of hydrogenated monomers are notably non fluorinated alpha-olefins, including ethylene, propylene, 1-butene, diene monomers, styrene monomers, alpha-olefins being typically used.

Fluoroelastomers (A) are in general amorphous products or products having a low degree of crystallinity (crystalline phase less than 20% by volume) and a glass transition temperature (T$_g$) below room temperature. In most cases, the fluoroelastomer (A) has advantageously a T$_g$ below 10° C., preferably below 5° C., more preferably 0° C.

The monomer (M) is preferably a perfluoromethoxyalkylvinylether of formula (I):

$$CF_2=CFOCF_2OR'_f \qquad \text{formula (I)}$$

wherein $R'_f$ is selected from the group consisting of $C_1$-$C_6$ perfluoroalkyls, linear or branched; $C_5$-$C_6$ cyclic perfluoroalkyls; and $C_2$-$C_6$ perfluorooxyalkyls, linear or branched, comprising from 1 to 3 catenary ethereal oxygen atoms.

The monomer (M) can be advantageously selected from the group consisting of:

$$CF_2=CFOCF_2O-CF_3; \qquad (M1)$$

$$CF_2=CFOCF_2O-CF_2CF_3; \qquad (M2)$$

$$CF_2=CFOCF_2O-CF_2CF_2OCF_3, \qquad (M3)$$

with the monomer (M) of formula (M1) being generally preferred.

The fluoroelastomer (A) is preferably selected among:
(1) VDF-based copolymers, comprising recurring units derived from VDF, from the monomer (M) and optionally from at least one additional (per)fluorinated monomer different from monomer (M) and VDF [comonomer (C)];
(2) TFE-based copolymers, comprising recurring units derived from TFE, from the monomer (M) and optionally from at least one additional (per)fluorinated monomer different from monomer (M) and TFE [comonomer (C)].

Comonomer (C) will be generally selected from (per)fluorinated monomers, as above detailed, with the provision that:
if the fluoroelastomer (A) is a VDF-based copolymer, comonomer (C) is not VDF; and
if the fluoroelastomer (A) is a TFE-based copolymer, comonomer (C) is not TFE.

It is generally understood that the sum of recurring units derived from monomer (M) and comonomer (C) in fluoroelastomer (A) of the invention generally represents at least 10% moles, preferably at least 15% moles, more preferably at least 17% moles, with respect to the total amount of recurring units of fluoroelastomer (A).

As said, the fluoroelastomer (A) comprises at least 1% moles, with respect to the total moles of recurring units, of recurring units derived from monomer (M); typically, fluoroelastomer (A) will comprise at least 3%, more preferably at least 5%, more preferably at least 10% moles, with respect to the total moles of recurring units, of recurring units derived from monomer (M).

The fluoroelastomer (A) is more preferably selected from the group consisting of:
(1) VDF-based copolymers, comprising recurring units derived from VDF, recurring units derived from monomer (M) and optionally at least one comonomer selected from the group consisting of the followings classes:
(a) $C_2$-$C_8$ perfluoroolefins, such as tetrafluoroethylene (TFE), hexafluoropropylene (HFP), hexafluoroisobutylene;
(b) hydrogen-containing $C_2$-$C_8$ olefins, such as vinyl fluoride (VF), trifluoroethylene (TrFE), perfluoroalkyl ethylenes of formula $CH_2=CH-R_f$, wherein $R_f$ is a $C_1$-$C_6$ perfluoroalkyl group;
(c) $C_2$-$C_8$ chloro and/or bromo and/or iodo-fluoroolefins such as chlorotrifluoroethylene (CTFE);
(d) (per)fluoroalkylvinylethers (PAVE) of formula $CF_2=CFOR_f$, wherein $R_f$ is a $C_1$-$C_6$ (per)fluoroalkyl group, e.g. $CF_3$, $C_2F_5$, $C_3F_7$;
(e) (per)fluoro-oxy-alkylvinylethers of formula $CF_2=CFOX$, wherein X is a $C_1$-$C_{12}$ ((per)fluoro)-oxyalkyl comprising catenary oxygen atoms, e.g. the perfluoro-2-propoxypropyl group;

(f) (per)fluorodioxoles having formula:

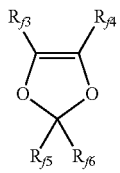

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom, such as notably $-CF_3$, $-C_2F_5$, $-C_3F_7$, $-OCF_3$, $-OCF_2CF_2OCF_3$; preferably, perfluorodioxoles;
(g) $C_2$-$C_8$ non-fluorinated olefins (OI), for example ethylene and propylene; and
(2) TFE-based copolymers, comprising recurring units derived from TFE, recurring units derived from monomer (M) and, optionally, from at least one comonomer selected from the group consisting of classes (c), (d), (e), (g), as above detailed.

When aiming at obtaining materials having lower glass transition temperatures, among above referred fluoroelastomers (A), VDF-based copolymers are preferred and provide for increased crosslinking density, thus improved mechanical properties, while reducing the cost.

Among VDF-based copolymers, polymers comprising (with respect to total moles of recurring units of fluoroelastomer (A)):
from 5 to 35% moles, preferably from 7 to 30% moles, more preferably from 15 to 25% moles of recurring units derived from monomer (M);
from 0.5 to 35% moles, preferably from 1 to 30% moles, more preferably from 2 to 25% moles of recurring units derived from at least one $C_2$-$C_8$ perfluoroolefin, typically selected from tetrafluoroethylene (TFE), hexafluoropropylene (HFP), hexafluoroisobutylene, preferably from TFE;
with the provisio that the sum of recurring units derived from monomer (M) and from the perfluoroolefin is of at least 10% moles, preferably at least 15% moles, more preferably at least 17% moles;
and
from 90 to 30% moles, preferably from 85 to 40% moles, more preferably from 83 to 50% moles of recurring units derived from VDF.

Optionally, fluoroelastomer (A) of the present invention also comprises recurring units derived from a bis-olefin [bis-olefin (OF)] having general formula:

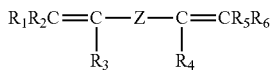

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ alkylene or cycloalkylene radical, optionally containing oxygen atoms, preferably at least partially fluorinated, or a (per)fluoropolyoxyalkylene radical, e.g. as described in EP 661304 A (AUSIMONT SPA) 5 Jul. 1995.

The bis-olefin (OF) is preferably selected from the group consisting of those complying with formulae (OF-1), (OF-2) and (OF-3):

(OF-1)

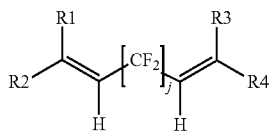

wherein j is an integer between 2 and 10, preferably between 4 and 8, and R1, R2, R3, R4, equal or different from each other, are H, F or $C_{1-5}$ alkyl or (per)fluoroalkyl group;

(OF-2)

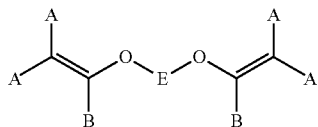

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C=CF-O-(CF_2)_5-O-CF=CF_2$.

(OF-3)

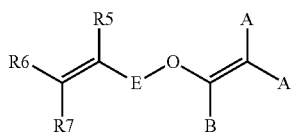

wherein E, A and B have the same meaning as above defined; R5, R6, R7, equal or different from each other, are H, F or $C_{1-5}$ alkyl or (per)fluoroalkyl group.

The fluoroelastomer of the invention has a number-averaged molecular weight of 3 000 to 45 000.

The number average molecular weight ($M_n$) is:

$$M_n = \frac{\sum M_i \cdot N_i}{\sum N_i},$$

which can be notably determined by GPC.

Other molecular parameters which can be notably determined by GPC are the weight average molecular weight ($M_w$):

$$M_w = \frac{\sum M_i^2 \cdot N_i}{\sum M_i \cdot N_i},$$

and the polydispersity index (PDI), which is hereby expressed as the ratio of weight average molecular weight ($M_w$) to number average molecular weight ($M_n$).

The fluoroelastomer (A) of the invention has a number-averaged molecular weight of preferably at least 7 000, more preferably at least 10 000, even more preferably at least 12 000.

The fluoroelastomer (A) of the invention has a number-averaged molecular weight of preferably at most 40 000, more preferably at most 35 000, even more preferably at most 30 000.

The fluoroelastomer (A) preferably possesses a dynamic viscosity, measured according to ASTM D4440 of less than 4 000 Pa×sec, preferably of less than 3 000 Pa×sec, more preferably of less than 2 000 Pa×sec, even more preferably of less than 1 500 Pa×sec, when determined at 40° C. at a shear rate of 0.5 rad/sec.

Further, in addition, fluoroelastomer (A) preferably possesses a dynamic viscosity, measured according to ASTM D4440 of less than 150 Pa×sec, preferably of less than 140 Pa×sec, more preferably of less than 120 Pa×sec, when determined at 80° C. at a shear rate of 0.5 rad/sec.

Lower boundaries for dynamic viscosity are not particularly limited; it is nevertheless generally understood that fluoroelastomers (A), wherein the dynamic viscosity, measured according to ASTM D4440 at 40° C. and at a shear rate of 0.5 rad/sec, is of at least 10 Pa×sec, preferably at least 50 Pa×sec, more preferably at least 100 Pa×sec, are those which exhibit best crosslinking behaviour.

According to certain preferred embodiments of the invention, the fluoroelastomer (A) comprises cure sites; the selection of cure sites is not particularly critical, provided that they ensure adequate reactive in curing.

The fluoroelastomer (A) can comprise said cure sites either as pendant groups bonded to certain recurring units or as end groups of the polymer chain.

Among cure-site containing recurring units, mention can be notably made of:

(CSM-1) iodine or bromine containing monomers of formula:

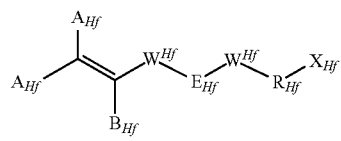

wherein each of $A_{Hf}$, equal to or different from each other and at each occurrence, is independently selected from F, Cl, and H; $B_{Hf}$ is any of F, Cl, H and $OR^{Hf}_B$, wherein $R^{Hf}_B$ is a branched or straight chain alkyl radical which can be partially, substantially or completely fluorinated or chlorinated; each of $W^{Hf}$ equal to or different from each other and at each occurrence, is independently a covalent bond or an oxygen atom; $E_{Hf}$ is a divalent group having 2 to 10 carbon atom, optionally fluorinated; $R_{Hf}$ is a branched or straight chain alkyl radical, which can be partially, substantially or completely fluorinated; and $R_{Hf}$ is a halogen atom selected from the group consisting of Iodine and Bromine; which may be inserted with ether linkages; preferably E is a —$(CF_2)_m$— group, with m being an integer from 3 to 5;

(CSM-2) ethylenically unsaturated compounds comprising cyanide groups, possibly fluorinated.

Among cure-site containing monomers of type (CSM1), preferred monomers are those selected from the group consisting of:

(CSM1-A) iodine-containing perfluorovinylethers of formula:

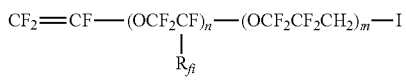

with m being an integer from 0 to 5 and n being an integer from 0 to 3, with the provisio that at least one of m and n is different from 0, and $R_{fi}$ being F or $CF_3$; (as notably described in U.S. Pat. No. 4,745,165 (AUSIMONT SPA) 17 May 1988, U.S. Pat. No. 4,564,662 (MINNESOTA MINING & MFG [US]) 14 Jan. 1986 and EP 199138 A (DAIKIN IND LTD) 29 Oct. 1986); and (CSM-1B) iodine-containing ethylenically unsaturated compounds of formula:

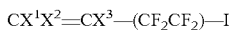

wherein each of $X^1$, $X^2$ and $X^3$, equal to or different from each other, are independently H or F; and p is an integer from 1 to 5; among these compounds, mention can be made of $CH_2$=$CHCF_2CF_2I$, $I(CF_2CF_2)_2CH$=$CH_2$, $ICF_2CF_2CF$=$CH_2$, $I(CF_2CF_2)_2CF$=$CH_2$;
(CSM-1C) iodine-containing ethylenically unsaturated compounds of formula:

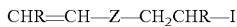

wherein R is H or $CH_3$, Z is a $C_1$-$C_{18}$ (per)fluoroalkylene radical, linear or branched, optionally containing one or more ether oxygen atoms, or a (per)fluoropolyoxyalkylene radical; among these compounds, mention can be made of $CH_2$=$CH$—$(CF_2)_4$—$CH_2CH_2I$, $CH_2$=$CH$—$(CF_2)_6CH_2CH_2I$, $CH_2$=$CH$—$(CF_2)_8CH_2CH_2I$, $CH_2$=$CH$—$(CF_2)_2CH_2CH_2I$;
(CSM-1D) bromo and/or iodo alpha-olefins containing from 2 to 10 carbon atoms such as bromotrifluoroethylene or bromotetrafluorobutene described, for example, in U.S. Pat. No. 4,035,565 (DU PONT) 12 Jul. 1977 or other compounds bromo and/or iodo alpha-olefins disclosed in U.S. Pat. No. 4,694,045 (DU PONT) 15 Sep. 1987.

Among cure-site containing monomers of type (CSM2), preferred monomers are those selected from the group consisting of:
(CSM2-A) perfluorovinyl ethers containing cyanide groups of formula $CF_2$=$CF$—$(OCF_2CFX^{CN})_m$—$O$—$(CF_2)_n$—$CN$, with $X^{CN}$ being F or $CF_3$, m being 0, 1, 2, 3 or 4; n being an integer from 1 to 12;
(CSM2-B) perfluorovinyl ethers containing cyanide groups of formula $CF_2$=$CF$—$(OCF_2CFX^{CN})_{m'}$—$O$—$CF_2$—$CF(CF_3)$—$CN$, with $X^{CN}$ being F or $CF_3$, m' being 0, 1, 2, 3 or 4.

Specific examples of cure-site containing monomers of type CSM2-A and CSM2-B suitable to the purposes of the present invention are notably those described in U.S. Pat. No. 4,281,092 (DU PONT) 28 Jul. 1981, U.S. Pat. No. 4,281,092 (DU PONT) 28 Jul. 1981, U.S. Pat. No. 5,447,993 (DU PONT) 5 Sep. 1995 and U.S. Pat. No. 5,789,489 (DU PONT) 4 Aug. 1998.

Preferably, fluoroelastomer (A) of the invention comprises iodine or bromine cure sites in an amount of 0.001 to 10% wt. Among these, Iodine cure sites are those selected for maximizing curing rate.

According to this embodiment, for ensuring acceptable reactivity it is generally understood that the content of iodine and/or bromine in the fluoroelastomer (A) should be of at least 0.05% wt, preferably of at least 0.1% weight, more preferably of at least 0.15% weight, with respect to the total weight of fluoroelastomer (A).

On the other side, amounts of iodine and/or bromine not exceeding preferably 7% wt, more specifically not exceeding 5% wt, or even not exceeding 4% wt, with respect to the total weight of fluoroelastomer (A), are those generally selected for avoiding side reactions and/or detrimental effects on thermal stability.

These iodine or bromine cure sites of these preferred embodiments of the invention might be comprised as pending groups bound to the backbone of the fluoroelastomer (A) polymer chain or might be comprised as terminal groups of said polymer chain.

According to a first embodiment, the iodine and/or bromine cure sites are comprised as pending groups bound to the backbone of the fluoroelastomer polymer chain; the fluoroelastomer (A) according to this embodiment typically comprises recurring units derived from brominated and/or iodinated cure-site comonomers selected from:
bromo and/or iodo alpha-olefins containing from 2 to 10 carbon atoms such as bromotrifluoroethylene or bromotetrafluorobutene described, for example, in U.S. Pat. No. 4,035,565 (DU PONT) 12 Jul. 1977 or other compounds bromo and/or iodo alpha-olefins disclosed in U.S. Pat. No. 4,694,045 (DU PONT) 15 Sep. 1987;
iodo and/or bromo fluoroalkyl vinyl ethers (as notably described in U.S. Pat. No. 4,745,165 (AUSIMONT SPA) 17 May 1988, U.S. Pat. No. 4,564,662 (MINNESOTA MINING & MFG [US]) 14 Jan. 1986 and EP 199138 A (DAIKIN IND LTD) 29 Oct. 1986).

The fluoroelastomer according to this embodiment generally comprises recurring units derived from brominated and/or iodinated cure-site monomers in amounts of 0.05 to 5 mol per 100 mol of all other recurring units of the fluoroelastomer, so as to advantageously ensure above mentioned iodine and/or bromine weight content.

According to a second preferred embodiment, the iodine and/or bromine cure sites are comprised as terminal groups of the fluoroelastomer polymer chain; the fluoroelastomer according to this embodiment is generally obtained by addition to the polymerization medium during fluoroelastomer manufacture of anyone of:
iodinated and/or brominated chain-transfer agent(s); suitable chain-chain transfer agents are typically those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \le x+y \le 2$ (see, for example, U.S. Pat. No. 4,243,770 (DAIKIN IND LTD) 6 Jan. 1981 and U.S. Pat. No. 4,943,622 (NIPPON MEKTRON KK) 24 Jul. 1990); and
alkali metal or alkaline-earth metal iodides and/or bromides, such as described notably in U.S. Pat. No. 5,173,553 (AUSIMONT SRL) 22 Dec. 1992.

The invention also pertains to the use of the fluoroelastomer (A) as above described for fabricating shaped articles.

The fluoroelastomer (A) can then be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, fluoroelastomer into a finished article made of non-tacky, strong, insoluble, chemically and thermally resistant cured fluoroelastomer.

The fluoroelastomer of the invention is advantageously cured by peroxide curing technique, by ionic technique, by tin-catalyzed curing or by a mixed peroxidic/ionic technique.

The peroxide curing is typically performed according to known techniques via addition of suitable peroxide that is capable of generating radicals by thermal decomposition. Organic peroxides are generally employed.

Still an object of the invention is thus a peroxide curable composition comprising fluoroelastomer (A) as above detailed and at least one peroxide, typically an organic peroxide.

Among most commonly used peroxides, mention can be made of dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl]carbonate. Other suitable peroxide systems are those described, notably, in patent applications EP 136596 A (MONTEDISON SPA) 10 Apr. 1985 and EP 410351 A (AUSIMONT SRL) 30 Jan. 1991, whose content is hereby incorporated by reference.

Other ingredients generally comprised in the peroxide curable composition, as above detailed, are:
(a) curing coagents, in amounts generally of between 0.5% and 10% and preferably between 1% and 7% by weight relative to the polymer; among these agents, the following are commonly used: triallyl cyanurate; triallyl isocyanurate (TAIC); tris(diallylamine)-s-triazine; triallyl phosphite; N,N-diallylacrylamide; N,N,N',N'-tetraallylmalonamide; trivinyl isocyanurate; 2,4,6-trivinyl methyltrisiloxane; bis-olefins (OF), as above detailed; triazines substituted with ethylenically unsaturated groups, such as notably those described in EP 860436 A (AUSIMONT SPA) 26 Aug. 1998 and WO 97/05122 (DU PONT [US]) 13 Feb. 1997; among above mentioned curing coagents, TAIC and bis-olefins (OF), as above detailed, and more specifically those of formula (OF-1), as above detailed, have been found to provide particularly good results;
(b) optionally, a metallic compound, in amounts of between 1% and 15% and preferably between 2% and 10% by weight relative to the weight of the polymer, chosen from oxides or hydroxides of divalent metals, for instance Mg, Zn, Ca or Pb, optionally combined with a salt of a weak acid, for instance Ba, Na, K, Pb, Ca stearates, benzoates, carbonates, oxalates or phosphites;
(c) optionally, acid acceptors of the metal non-oxide type, such as 1,8-bis(dimethylamino)naphthalene, octadecylamine, etc., as notably described in EP 708797 A (DU PONT) 1 May 1996;
(d) optionally, other conventional additives, such as fillers, thickeners, pigments, antioxidants, stabilizers, processing aids, and the like.

Ionic curing can be achieved by mixing to the fluoroelastomer (A) one or more curing agent and one or more accelerator suitable for ionic curing, as well known in the art.

Still an object of the invention is thus an ionically curable composition comprising fluoroelastomer (A) as above detailed and at least one curing agent and at least one accelerator.

The amounts of accelerator(s) are generally comprised between 0.05 and 5 phr and that of the curing agent typically between 0.5 and 15 phr and preferably between 1 and 6 phr.

Aromatic or aliphatic polyhydroxylated compounds, or derivatives thereof, may be used as curing agents; examples thereof are described, notably, in EP 335705 A (MINNESOTA MINING & MFG [US]+) 4 Oct. 1989 and U.S. Pat. No. 4,233,427 (RHONE POULENC IND) 11 Nov. 1980. Among these, mention will be made in particular of dihydroxy, trihydroxy and tetrahydroxy benzenes, naphthalenes or anthracenes; bisphenols, in which the two aromatic rings are linked together via an aliphatic, cycloaliphatic or aromatic divalent radical, or alternatively via an oxygen or sulphur atom, or else a carbonyl group. The aromatic rings may be substituted with one or more chlorine, fluorine or bromine atoms, or with carbonyl, alkyl or acyl groups. Bisphenol AF is particularly preferred.

Examples of accelerators that may be used include: quaternary ammonium or phosphonium salts (see, e.g., EP 335705 A (MINNESOTA MINING & MFG [US]+) 4 Oct. 1989 and U.S. Pat. No. 3,876,654 (DU PONT) 8 Apr. 1975); aminophosphonium salts (see, e.g., U.S. Pat. No. 4,259,463 (MONTEDISON SPA) 31 Mar. 1981); phosphoranes (see, e.g., U.S. Pat. No. 3,752,787 (DU PONT) 14 Aug. 1973); imine compounds of formula $[Ar_3P-N=PAr_3]^{+n}X^{n-}$, with Ar being an aryl group, n=1 or 2 and X being a n-valent anion as described in EP 0120462 A (MONTEDISON SPA) 3 Oct. 1984 or of formula $[(R_3P)_2N]^+X^-$, with R being an aryl or an alkyl group, and X being a monovalent anion, e.g. as described in EP 0182299 A (ASAHI CHEMICAL IND) 28 May 1986. Quaternary phosphonium salts and aminophosphonium salts are preferred.

Instead of using the accelerator and the curing agent separately, it is also possible to use an adduct between an accelerator and a curing agent in a mole ratio of from 1:2 to 1:5 and preferably from 1:3 to 1:5, the accelerator being one of the organic onium compounds having a positive charge, as defined above, and the curing agent being chosen from the compounds indicated above, in particular dihydroxy or polyhydroxy or dithiol or polythiol compounds; the adduct being obtained by melting the product of reaction between the accelerator and the curing agent in the indicated mole ratios, or by melting the mixture of the 1:1 adduct supplemented with the curing agent in the indicated amounts. Optionally, an excess of the accelerator, relative to that contained in the adduct, may also be present.

The following are particularly preferred as cations for the preparation of the adduct: 1,1-diphenyl-1-benzyl-N-diethyl-phosphoranamine and tetrabutylphosphonium; particularly preferred anions are bisphenol compounds in which the two aromatic rings are bonded via a divalent radical chosen from perfluoroalkyl groups of 3 to 7 carbon atoms, and the OH groups are in the para position. A method suitable for the preparation of an adduct as above described is described in European patent application EP 0684277 A (AUSIMONT SPA [IT]) 29 Nov. 1995, which is included herein in its entirety by reference.

Other ingredients generally added to the ionically curable composition comprising fluoroelastomer (A) of the invention, when curing via ionic route are:
i) one or more mineral acid acceptors chosen from those known in the ionic curing of vinylidene fluoride copolymers, typically comprised in amounts of 1-40 parts per 100 parts of fluoroelastomer (A);
ii) one or more basic compounds chosen from those known in the ionic curing of vinylidene fluoride copolymers, typically added in amounts of from 0.5 to 10 parts per 100 parts of fluoroelastomer (A).

The basic compounds mentioned in point ii) are commonly chosen from the group constituted by $Ca(OH)_2$, $Sr(OH)_2$, $Ba(OH)_2$, metal salts of weak acids, for instance Ca, Sr, Ba, Na and K carbonates, benzoates, oxalates and phosphites and mixtures of the abovementioned hydroxides with the above mentioned metal salts; among the compounds of the type i), mention may be made of MgO.

The above mentioned amounts of the mixture are relative to 100 phr of fluoroelastomer (A). Also, other conventional additives, such as fillers, thickeners, pigments, antioxidants, stabilizers and the like, may then be added to the curing mixture.

Mixed peroxidic/ionic curing can be achieved by simultaneously introducing in the curable composition one or more peroxide, as above detailed, and one or more curing agent and one or more accelerator suitable for ionic curing, as well known in the art.

When the fluoroelastomer (A) comprises recurring units derived from ethylenically unsaturated compounds comprising cyanide groups of type (CSM-2) as above detailed, organotin compounds or diaromatic amine compounds, as notably described in U.S. Pat. No. 4,394,489 (DU PONT) 19 Jul. 1983 (disclosing allyl-, propargyl- and allenyl-tin curatives), U.S. Pat. No. 5,767,204 (NIPPON MEKTRON KK) 16 Jun. 1998 (providing bis(aminophenyl) compounds represented by formula:

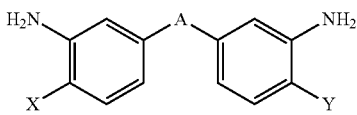

wherein A is an alkylidene group having 1 to 6 carbon atoms or a perfluoroalkylidene group having 1 to 10 carbon atoms and X and Y are a hydroxyl group or an amino group) and U.S. Pat. No. 5,789,509 (DU PONT) 4 Aug. 1998 (disclosing tetraalkyltin, tetraaryltin compounds, bis(aminophenols) and bis(aminothiophenols)). This type of vulcanization may be combined with a vulcanization of peroxide type, in the case where the fluoroelastomer matrix contains iodinated and/or brominated end groups, as described notably in U.S. Pat. No. 5,447,993 (DU PONT) 5 Sep. 1995.

Finally, the invention pertains to cured articles obtained from the fluoroelastomer (A). Said cured articles are generally obtained by moulding and curing the peroxide curable composition, as above detailed.

Further in addition, the invention pertains to a method for processing fluoroelastomer (A) according any of liquid injection moulding technique, screen printing technique, form-in-place technique. These techniques are described above.

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention.

EXAMPLES

Example 1

Preparation of Fluoroelastomer A-1

In a 5 liters reactor equipped with a mechanical stirrer operating at 630 rpm, 3.5 l of demineralized water and 35 ml of a microemulsion, previously obtained by mixing 8.3 ml of a perfluoropolyoxyalkylene having acidic end groups of formula: $CF_2ClO(CF_2-CF(CF_3)O)_n(CF_2O)_mCF_2COOH$, wherein $n/m=10$, having average molecular weight of 600, 2.2 ml of a 30% v/v $NH_4OH$ aqueous solution, 19.6 ml of demineralised water and 4.9 ml of GALDEN® D02 perfluoropolyether of formula: $C-F_{-3}-O(CF_2CF(CF_3)O)_n(CF_2O)_mCF_3$ with $n/m=20$, having average molecular weight of 450, were introduced.

The reactor was heated and maintained at a set-point temperature of 70° C. 50 g of monomer (M1) of formula $CF_2=CF-O-CF_2-O-CF_3$ were introduced, and a mixture of tetrafluoroethylene (TFE) (25.9% moles) and vinylidene fluoride (VDF) (74.1% moles) was then added to reach a final pressure of 11 bar (1.1 MPa). 56 g of 1,4-diiodoperfluorobutane ($C_4F_8I_2$) as chain transfer agent and 0.7 g of ammonium persulfate (APS) as initiator were then introduced. Pressure was maintained at set-point of 11 bar by continuous feeding of a gaseous mixture of TFE (20.5% moles) and VDF (79.5% moles) up to a total of 740 g, and 760 g of monomer (M1) in 20 portions of 38 g, starting from the beginning of the polymerization and for every 5% increase in the conversion of gaseous mixture, were also fed to the reactor. Then the reactor was cooled, vented and the latex recovered. The latex was coagulated by freezing and subsequent thawing, the polymer separated from the aqueous phase, washed with demineralised water and dried in a convection oven at 100° C. for 16 hours. The properties of the obtained polymer are summarized in table 3.

Fluoroelastomer of Example 1 was compounded with the additives in a Speedmixer. Plaques were cured in a pressed mould and then post-treated in an air circulating oven in conditions (time, temperature) below specified.

The tensile properties have been determined on specimens punched out from the plaques, according to the DIN 53504 S2 Standard.

M100 is the tensile strength in MPa at an elongation of 100%;
TS is the tensile strength in MPa;
EB is the elongation at break in %.

The Shore A hardness (3") (HDS) has been determined on 3 pieces of plaque piled according to the ASTM D 2240 method.

Compression set values have been determined on 3 disks punched out from the plaques piled according to the ASTM D 395-B method.

Curing recipe and conditions and properties of cured sample are summarized, respectively, in tables 1 and 2.

TABLE 1

| A-1 (from Ex. 1) | wt parts | 100 |
| Trigonox 101[1] | phr | 1.5 |
| Taicros[2] | phr | 3.0 |
| Carbon black[3] N991 | phr | 20 |

[1]2,5-dimethyl-2,5-di-t-butyl-peroxy- hexane, commercially available from AkzoNobel;
[2]Triallyl isocyanurate, commercially available from Evonik;
[3]C-black N991.

TABLE 2

| Property | unit | Ex. 1 |
|---|---|---|
| Moulding/curing: 5 min at 170° C. Post-cure: 4 h at 180° C. Mechanical properties on S2 samples | | |
| TS | MPa | 5.1 |
| M100 | MPa | 1.3 |

TABLE 2-continued

| Property | unit | Ex. 1 |
|---|---|---|
| EB | % | 150 |
| HDS | ShA | 59 |
| Compression set after post-cure 4 h at 180° C. | | |
| C-SET | % | 27 |

Example 2

Preparation of Fluoroelastomer A-2

Same procedure as detailed in Example 1 was repeated, but a mixture of TFE (11% moles) and VDF (89% moles) was added to reach a final pressure of 11 bar (1.1 MPa) and 62 g of $C_4F_8I_2$ as chain transfer agent were introduced, the gaseous mixture continuously fed was TFE (7% moles) and VDF (93% moles) up to a total of 850 g, and 650 g of monomer (M1) in 20 portions of 32.5 g, starting from the beginning of the polymerization and for every 5% increase in the conversion of gaseous mixture, were fed to the reactor. Furthermore, 0.36 g of APS at 15% of conversion of gaseous mixture and 0.7 g of APS at 25% of conversion of gaseous mixture were also fed. The properties of the obtained polymer are summarized in table 3.

Comparative Example 3

In a 10 liters reactor equipped with a mechanical stirrer operating at 545 rpm, 6 l of demineralized water and 60 ml of a microemulsion, previously obtained by mixing 13 ml of a perfluoropolyoxyalkylene having acidic end groups of formula: $CF_2ClO(CF_2—CF(CF_3)O)_n(CF_2O)_mCF_2COOH$, wherein n/m=10, having average molecular weight of 600, 4.6 ml of a 30% v/v NH4OH aqueous solution, 34.6 ml of demineralised water and 7.8 ml of GALDEN® D02 perfluoropolyether of formula: $C—F_{-3}—O(CF_2CF(CF_3)O)_n(CF_2O)_mCF_3$ with n/m=20, having average molecular weight of 450, were introduced.

The reactor was heated and maintained at a set-point temperature of 80° C. A mixture of TFE (7.7% moles), VDF (48.7% moles) and hexafluoropropene (HFP) (43.6% moles) was then added to reach a final pressure of 31 bar (3.1 MPa). 152 g of $C_4F_8I_2$ as chain transfer agent and 2.05 g of APS as initiator were then introduced. Pressure was maintained at set-point of 31 bar by continuous feeding of a gaseous mixture of TFE (11% moles), VDF (70% moles) and HFP (19% moles) up to a total of 3500 g. Then the reactor was cooled, vented and the latex recovered. The latex was coagulated by freezing and subsequent thawing, the polymer separated from the aqueous phase, washed with demineralised water and dried in a convection oven at 100° C. for 16 hours. The properties of the obtained polymer are summarized in table 3.

Comparative Example 4

In a 5 liters reactor equipped with a mechanical stirrer operating at 630 rpm, 3.5 l of demineralized water and 35 ml of a microemulsion, previously obtained by mixing 7.6 ml of a perfluoropolyoxyalkylene having acidic end groups of formula: $CF_2ClO(CF_2—CF(CF_3)O)_n(CF_2O)_mCF_2COOH$, wherein n/m=10, having average molecular weight of 600, 2.7 ml of a 30% v/v NH4OH aqueous solution, 20.2 ml of demineralised water and 4.5 ml of GALDEN® D02 perfluoropolyether of formula: $C—F_{-3}—O(CF_2CF(CF_3)O)_n(CF_2O)_mCF_3$ with n/m=20, having average molecular weight of 450, were introduced.

The reactor was heated and maintained at a set-point temperature of 80° C. A mixture of TFE (13.3% moles), VDF (17.8% moles) and HFP (68.9% moles) was then added to reach a final pressure of 31 bar (3.1 MPa). 57.3 g of $C_4F_8I_2$ as chain transfer agent and 1.2 g of APS as initiator were then introduced. Pressure was maintained at set-point of 31 bar by continuous feeding of a gaseous mixture of TFE (25% moles), VDF (48% moles) and HFP (27% moles) up to a total of 1500 g. Then the reactor was cooled, vented and the latex recovered. The latex was coagulated by freezing and subsequent thawing, the polymer separated from the aqueous phase, washed with demineralised water and dried in a convection oven at 100° C. for 16 hours. The properties of the obtained polymer are summarized in table 3.

Comparative Example 5

Same procedure as detailed in Example 4 was repeated, but a mixture of TFE (6.1% moles), perfluoromethylvinylether (MVE) (33.4% moles) and VDF (60.5% moles) was added to reach a final pressure of 31 bar (3.1 MPa), 64.7 g of $C_4F_8I_2$ as chain transfer agent and 0.8 g of APS as initiator were introduced, and the gaseous mixture continuously fed was TFE (8% moles), MVE (18% moles) and VDF (74% moles). The properties of the obtained polymer are summarized in table 3.

Characterization of Fluoroelastomers

PPR (parallel plates rheology) at 0.5 rad/s—Viscosity-Oscillatory measurements. Dynamic viscosity of the elastomers was measured according to ASTM D4440 in a temperature range between 40° C. and 120° C. using a strain controlled rheogoniometer Rheometric Scientific ARES in a parallel plate configuration. This instrument employs an actuator to apply a deforming strain to the sample and a separate transducer to measure the resultant stress developed within the sample. The strain imposed was for each sample within the linear viscoelastic regime previously determined.

TABLE 3

| Run | unit | 1 | 2 | 3C | 4C | 5C |
|---|---|---|---|---|---|---|
| Monomer composition | | | | | | |
| TFE | % mol | 19.2 | 6 | 11 | 24 | 6 |
| VDF | % mol | 59.4 | 76.5 | 70 | 53 | 76.5 |
| HFP | % mol | | | 19 | 23 | |
| MVE | % mol | | | | | 17.5 |
| MOVE§ | % mol | 21.4 | 17.5 | | | |
| Fluorine content | % w | 65.2 | 63.3 | 67.16 | 69.9 | |
| Hydrogen content | % w | 1.1 | 1.6 | 1.66 | 1.15 | 1.8 |
| Iodine content | % w | 1.4 | 1.6 | 1.9 | 1.8 | 1.5 |
| GPC (Molecular weight) | | | | | | |
| $M_n$ | Dalton | 15200 | 16900 | 14100 | 12400 | 13500 |
| $M_w$ | Dalton | 20300 | 25300 | 24300 | 17700 | 20800 |
| $Pd_{MWD}$ | | 1.3 | 1.5 | 1.7 | 1.4 | 1.5 |
| PPR (parallel plates rheology): Complex viscosity at 40° C. at variable shear rate | | | | | | |
| 0.5 rad/s | Pa × s | 333 | 1098 | 5406 | 30539 | 3402 |
| 5 rad/s | Pa × s | 333 | 846 | 5113 | 17674 | 3102 |
| 50 rad/s | Pa × s | 328 | 659 | 3084 | 7750 | 2122 |

TABLE 3-continued

| Run | unit | 1 | 2 | 3C | 4C | 5C |
|---|---|---|---|---|---|---|
| PPR (parallel plates rheology): Complex viscosity at 80° C. at variable shear rate | | | | | | |
| 0.5 rad/s | Pa × s | 24 | 31 | 176 | 124 | 1152 |
| 5 rad/s | Pa × s | 24 | 30 | 175 | 105 | 112 |
| 50 rad/s | Pa × s | 23 | 30 | 173 | 98 | 111 |

§MOVE: monomer (M) of formula CF$_2$=CF—O—CF$_2$—O—CF$_3$

The invention claimed is:

1. A low viscosity curable fluoroelastomer or (per)fluoroelastomer [fluoroelastomer (A)] having a number-averaged molecular weight of 3,000 to 45,000, said fluoroelastomer (A) comprising:
   at least 1% moles, with respect to the total moles of recurring units, of recurring units derived from at least one (per)fluoromethoxyalkylvinylether of formula (I):

CFX'=CX"OCF$_2$OR$_f$    formula (I)

wherein X' and X", equal to or different from each other, are independently H or F; and R$_f$ is selected from the group consisting of C$_1$-C$_6$ (per)fluoroalkyls, linear or branched; C$_5$-C$_6$ cyclic (per)fluoroalkyls; and C$_2$-C$_6$ (per)fluorooxyalkyls, linear or branched, comprising from 1 to 3 catenary ethereal oxygen atoms [monomer (M)],
      recurring units derived from vinylidene fluoride (VDF), from tetrafluoroethylene (TFE), or from a combination thereof, and optionally
      recurring units derived from at least one additional (per) fluorinated monomer [comonomer (C)], wherein comonomer (C) is different from monomer (M), VDF and TFE.

2. The fluoroelastomer (A) of claim 1, wherein monomer (M) is a perfluoromethoxyalkylvinylether of formula (I):

CF$_2$=CFOCF$_2$OR'$_f$    formula (I)

wherein R'$_f$ is selected from the group consisting of C$_1$-C$_6$ perfluoroalkyls, linear or branched; C$_5$-C$_6$ cyclic perfluoroalkyls; and C$_2$-C$_6$ perfluorooxyalkyls, linear or branched, comprising from 1 to 3 catenary ethereal oxygen atoms.

3. The fluoroelastomer of claim 2, wherein monomer (M) is selected from the group consisting of:

CF$_2$=CFOCF$_2$—CF$_3$;    (M1)

CF$_2$=CFOCF$_2$O—CF$_2$CF$_3$; and    (M2)

CF$_2$=CFOCF$_2$O—CF$_2$CF$_2$OCF$_3$.    (M3)

4. The fluoroelastomer (A) of claim 1, wherein comonomer (C) is selected from the group consisting of:
   C$_2$-C$_8$ fluoro- and/or perfluoroolefins;
   1,2-difluoroethylene, vinylidene fluoride (VDF) and trifluoroethylene (TrFE);
   (per)fluoroalkylethylenes complying with formula CH$_2$=CH—R$_{f0}$, wherein R$_{f0}$ is a C$_1$-C$_6$ (per)fluoroalkyl or a C$_1$-C$_6$ (per)fluorooxyalkyl having one or more ether groups;
   chloro- and/or bromo- and/or iodo-C$_2$-C$_6$ fluoroolefins;
   fluoroalkylvinylethers complying with formula CF$_2$=CFOR$_{f1}$ wherein R$_{f1}$ is a C$_1$-C$_6$ fluoro- or perfluoroalkyl;
   hydrofluoroalkylvinylethers complying with formula CH$_2$=CFOR$_{f1}$ wherein R$_{f1}$ is a C$_1$-C$_6$ fluoro- or perfluoroalkyl;
   fluoro-oxyalkylvinylethers different from formula (I) and complying with formula CF$_2$=CFOX$_0$, wherein X$_0$ is a C$_1$-C$_{12}$ oxyalkyl, or a C$_1$-C$_{12}$ (per)fluorooxyalkyl having one or more ether groups;
   functional fluoro-alkylvinylethers complying with formula CF$_2$=CFOY$_0$, wherein Y$_0$ is a C$_1$-C$_{12}$ alkyl or (per)fluoroalkyl, or a C$_1$-C$_{12}$ oxyalkyl or a C$_1$-C$_{12}$ (per)fluorooxyalkyl, said Y$_0$ group comprising a carboxylic or sulfonic acid group, in its acid, acid halide or salt form;
   fluorodioxoles, of formula:

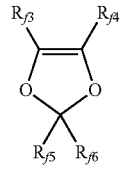

wherein each of R$_{f3}$, R$_{f4}$, R$_{f5}$, R$_{f6}$, equal or different each other, is independently a fluorine atom, a C$_1$-C$_6$ fluoro- or per(halo)fluoroalkyl, optionally comprising one or more oxygen atom,
   wherein:
      if the fluoroelastomer (A) is a VDF-based copolymer, comonomer (C) is not VDF; and
      if the fluoroelastomer (A) is a TFE-based copolymer, comonomer (C) is not TFE.

5. The fluoroelastomer (A) of claim 1, comprising at least 3% moles with respect to the total moles of recurring units, of recurring units derived from said monomer (M).

6. The fluoroelastomer (A) of claim 1, wherein the sum of recurring units derived from said monomer (M) and said comonomer (C) represents at least 10% moles, with respect to the total amount of recurring units of said fluoroelastomer (A).

7. The fluoroelastomer (A) of claim 6, said fluoroelastomer being selected from the group consisting of VDF-based copolymers comprising, with respect to total moles of recurring units of said fluoroelastomer (A):
   from 5 to 35% moles of recurring units derived from monomer (M);
   from 0.5 to 35% moles of recurring units derived from at least one C$_2$-C$_8$ perfluoroolefin;
   wherein the sum of recurring units derived from said monomer (M) and from the perfluoroolefin is of at least 10% moles; and
   from 90 to 30% moles of recurring units derived from said VDF.

8. The fluoroelastomer (A) of claim 1, having a number-averaged molecular weight of at least 7,000.

9. The fluoroelastomer (A) of claim 1, having a number-averaged molecular weight of at most 40,000.

10. The fluoroelastomer (A) of claim 1, further comprising cure sites as pendant groups bonded to certain recurring units.

11. The fluoroelastomer (A) of claim 10, wherein said cure-site containing recurring units are selected from the group consisting of:
   (CSM-1) iodine or bromine containing monomers of formula:

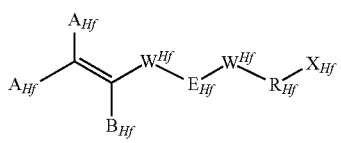

wherein each of $A_{Hf}$, equal to or different from each other and at each occurrence, is independently selected from F, Cl, and H; $B_{Hf}$ is any of F, Cl, H and $OR^{Hf}_B$, wherein $R^{Hf}_B$ is a branched or straight chain alkyl radical which can be partially, substantially or completely fluorinated or chlorinated; each of $W^{Hf}$ equal to or different from each other and at each occurrence, is independently a covalent bond or an oxygen atom; $E_{Hf}$ is a divalent group having 2 to 10 carbon atom, optionally fluorinated; $R_{Hf}$ is a branched or straight chain alkyl radical, which can be partially, substantially or completely fluorinated; and $X_{Hf}$ is a halogen atom selected from the group consisting of Iodine and Bromine; which may be inserted with ether linkages; and (CSM-2) ethylenically unsaturated compounds comprising cyanide groups, optionally fluorinated.

12. The fluoroelastomer (A) of claim 1, further comprising iodine or bromine cure sites in an amount of 0.001 to 10% wt.

13. The fluoroelastomer (A) of claim 12, wherein said iodine or bromine cure sites comprise pendant groups bound to the backbone of the fluoroelastomer (A) polymer chain and/or comprise terminal groups of said polymer chain.

14. The fluoroelastomer (A) of claim 12, wherein said fluoroelastomer (A) is obtained by addition to the polymerization medium during fluoroelastomer manufacture of any-one of:

iodinated and/or brominated chain-transfer agent(s); suitable chain-chain transfer agents are typically those of formula $R_f(I)_x(Br)_y$, wherein $R_f$ is a (per)fluoroalkyl or a (per)fluorochloroalkyl containing from 1 to 8 carbon atoms, while x and y are integers between 0 and 2, with $1 \leq x+y \leq 2$; and alkali metal or alkaline-earth metal iodides and/or bromides.

* * * * *